July 29, 1969 H. G. MARKEY 3,458,665
DATA TRANSMISSION CONSTANT CURRENT ADAPTER
Filed Dec. 20, 1965
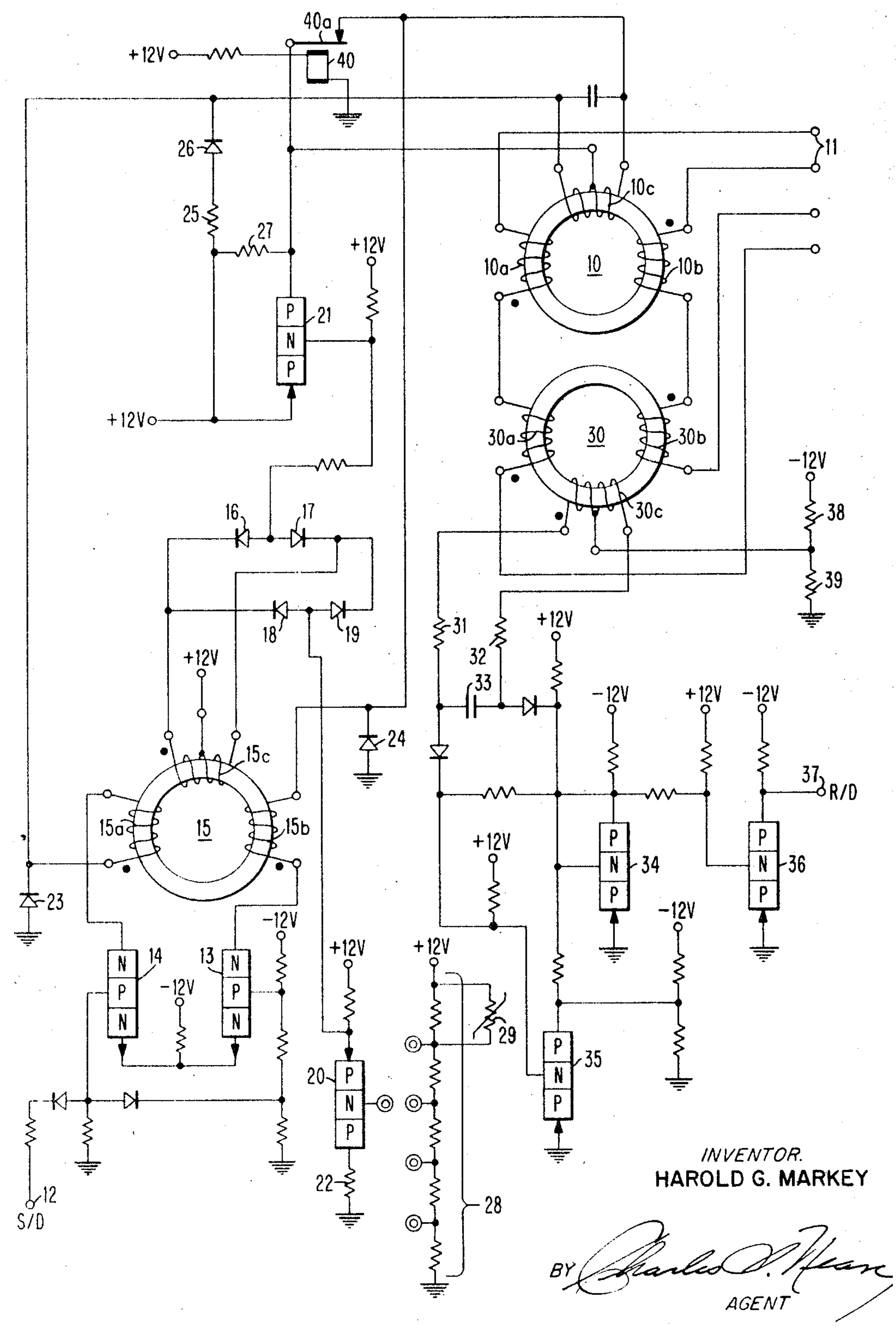
INVENTOR.
HAROLD G. MARKEY
BY [signature]
AGENT United States Patent Office 3,458,665

Patented July 29, 1969

3,458,665

DATA TRANSMISSION CONSTANT CURRENT ADAPTER

Harold G. Markey, Raleigh, N.C., assignor to International Business Machines Corporation, Armonk, N.Y., a corporation of New York Filed Dec. 20, 1965, Ser. No. 515,266
Int. Cl. H04l 15/04, 15/24
U.S. Cl. 178—68 3 Claims

ABSTRACT OF THE DISCLOSURE

Improved apparatus for electronically connecting the terminal units of a data transmission system with a communication line utilizing (a) a data signal transmitter section including a transmit coupling transformer for coupling the transmitter section with a communication line and transmit pulse control circuitry responsive to data signals from a data input terminal; (b) a data signal receiving section including a receive coupling transformer connected with the communication lines and control circuitry coupled with and responsive to the received data signals for applying the received data representing signals to a data terminal recording device.

This invention relates generally to improvements in data transmission apparatus and, more particularly, to an improved apparatus for electronically connecting the terminal units of a data transmission system with a communication line.

It is well known that energy is transmitted most efficiently by a communication line when the load impedance of the input and output devices connected with the line are substantially equal to the characteristic impedance of the line. Thus, to obtain transmission of energy with maximum efficiency it is necessary to provide means for matching a loaded impedance of the input and output devices to the characteritics impedance of the communication line and to particularly adapt the signals for their most efficient transmission. In the prior art there are many well-known devices for achieving the desired result. However, some of these devices are bulky and costly due to the high cost of the components used to obtain the desired result. In the present-day data communication system there is always a need for improved low-cost equipment.

Accordingly, it is a primary object of the present invention to provide an improved data transmission adapter device which is low in cost yet very reliable in operation.

In a preferred embodiment of the present invention the object is achieved by providing a bi-polar DC pulse line adapter arranged for use in either a loaded or non-loaded closed-loop data transmission system. Line coupling is achieved through transformers having core material with square-loop characteristics and the polarity of the windings being such that a balanced signal is produced on the data transmission line. Since the transformer cannot produce a DC signal, voltage pulses are generated on the line only when a transition occurs on the "send data" input terminal. Transition from "mark" to space" conditions produce a signal having one polarity on the line and opposite transitions produce a signal having the opposite polarity. The voltage pulses produced by the transitions will have a duration of approximately one millisecond. The duration of the transmitted pulses is controlled by a timing system comprising a transformer, diodes and transistors appropriately interconnected. To enable a receiving mode of operation the receiver transformer secondaries are connected with both sides of a data transmission line in the same manner as the transmitter transformer and through the medium of a low pass filter and the coercive force of the receiver transformer the receiver is relatively insensitive to noise. A relay is used to short the transmit transformer when a power "off" condition exists so that other adapters in the system may operate even though an adapter has been rendered inoperative.

Another object of the invention is to provide circuitry wherein the effect of line noise is minimized.

A further object of the invention is to provide circuitry utilizing a minimum of low cost components while giving an efficient and reliable operating adapter unit that has favorable data transmission characteristics.

The foregoing and other objects, features and advantages of the invention will be apparent from the following more particular description of the preferred embodiment of the invention, as illustrated in the accompanying drawings.

In the drawing the single figure is a preferred embodiment of the logic circuitry for a data transmission system constant current adapter.

Referring now to the drawing, the secondary windings 10*a* and 10*b* of the transmitter transformer 10 are connected with the terminals 11 which are adapted for coupling with a balanced data transmission line. The polarity of the windings is such that a balanced signal will be produced on the data transmission line. A requirement of the system of the preferred embodiment is that the ends of the data transmission line must be terminated with resistors so that the loop resistance is approximately 2,000 ohms. The balanced line signal must be approximately 16 volts so that the line current is about 8 milliamperes.

Since the transformer 10 is unable to produce a DC signal, voltage pulses are generated on the line only when a transition from "mark" to "space" or "space" to "mark" condition appears at the "send data" terminal 12. A transition from "mark" to "space" produces a signal having one polarity and an opposite transition produces a line signal of the opposite polarity. The resultant voltage pulses are approximately one millisecond in duration. Transistors 13 and 14 are connected in a manner that will produce a current mode switching which will in turn produce voltage pulses at the primary winding 10*c* of transformer 10. The signal transition appearing at terminal 12 controls which of the transistors 13 or 14 will be rendered conductive. When no data is being sent from the adapter, the voltage condition at the send data terminal 12 will be a "mark" condition.

The duration of a transmitted pulse appearing at the line terminal 11 is controlled by a timing system which comprises a timing transformer 15, diodes 16 through 19, and transistors 20 and 21. The core material of the timing transformer 15 has a square-loop characteristic. The circuit design is such that current will always be flowing in one of the primary windings 15*a* or 15*b* of the timing transformer 15 and the magnitude and phasing are such that when in a steady-state condition the core will be saturated in one polarity for "mark" and the opposite polarity for "space" conditions. The primary current is essentially from a constant current source because of a high collection impedance of transistors 13 and 14, which never attain a saturated condition.

For example, we may assume that the core of timing transformer 15 is saturated and the signal at the send data terminal 12 makes a transition. The drive current for the timing transformer 15 will cause the core to reverse polarity and a voltage will be generated in the secondary winding 15*c*. The resulting generated voltage is clamped at a magnitude of approximately 3 volts because one of the diodes 18 or 19 will be rendered conductive. The reference voltage for diodes 18 or 19 is controlled by the emitter of transistor 20 which constitutes a low impedance source. The base voltage for transistor 20 is adjustable at the time of circuit manufacture to compensate for the initial tolerances of some of the components of the timing system. The time required to saturate the core of transformer 15 is controlled by the volts/second capacity of the core in combination with the clamp voltage at the emitter of transistor 20. Resistor 22 in the collector of the emitter follower circuit including transistor 20 is to protect the transistor 20 and to reduce the power dissipation. The voltage across the secondary winding 15c when the core of transformer 15 is switching causes the transistor 21 to fully conduct. When the 1 millisecond period is completed transistor 21 will be rendered non-conductive. The time period is substantially constant with temperature variations because the diodes 18 and 19 and transistor 20 are arranged such that the voltage drop variations are in a cancelling direction. The temperature sensitive resistor 22 is chosen to compensate for the variation of a flux and temperature characteristic of the core of timing transformer 15.

When transistor 21 is conducting following a transition at the send data terminal 12, approximately 24 volts will appear across the total primary 10c of the transmitting transformer 10. The diodes 23 and 24 are connected with the line transformer primary 10c to prevent the transistors 13 and 14 from becoming fully conductive.

A switching block comprising transistors 13 and 14 are driven single-ended and the collector current for the transistor 14 is always greater than the collector current for the transistor 13. Resistor 25 and diode 26 supply current when transistor 14 is conducting so as to make the load current more nearly equal for both the "mark" and "space" conditions.

The transmitter transformer 10 has a core which possesses square-loop characteristics. The timing system of the adapter unit must always terminate a transmission pulse by rendering transistor 21 non-conductive before the transmitter transformer 10 completely saturates. If the transmitting transformer 10 saturates when transistor 21 is still conducting the transmission line capacitance will cause a reversal of the line current. Because of the low impedance of the transformer 10 when in a saturated state, the magnitude of the reverse current can be great enough to switch the receiver portion of the adapter unit to an erroneous state. If at the time transistor 21 is turned "off" and the transformer 10 is not saturated, this reverse current amplitude cannot exceed the transformer magnetization current which is appreciably less than the switching threshold for the receiver.

For reasons which will be subsequently explained, it is necessary to saturate the transmitting transformer 10 following the transmission of a pulse. Resistor 27 supplies the necessary magnetizing current to saturate the transformer 10. The transmission line impedance reflected to the transformer primary 10c in combination with resistor 27 forms a voltage divider which functions to limit the transmission line voltage to approximately 4 volts from the end of a pulse to the time at which transformer 10 saturates. Because of this low voltage, the reverse current at the time of saturation is well below the receiver threshold.

The time duration of the transmission pulse is inversely proportional to the amplitude of the positive supply voltage because of the voltage divider 28 coupled to the base of transistor 20. The characteristic so provided is desirable to keep the volts-seconds integral of the transmitting transformer 10 for a transmitted pulse independent of the supply voltage. In this manner under the most undesirable conditions, it is then easier to prevent the transformer 10 from saturating prior to the end of the transmit pulse.

In accordance with the preferred embodiment, up to five transmitter cans be coupled to the transmission line. When one adapter is transmitting the other adapters on the line must not present a significant impedance to the transmitted pulse. When an adapter is receiving the send data line is in a "mark" condition. In accordance with preferred terminal system design, sufficient time is allowed so that when an adapter goes to the "mark" condition and is at the end of a data transmission, the current through resistor 27 can saturate the transformer 10 before another adapter will start to transmit data representing signals.

When an adapter is in the "mark hold" or "receive mode" condition, a space bit signal transmitted by another adapter will merely increase the absolute value of the ampere-turns normally on the transformer 10 but no significant line voltage drop will occur. When a "mark" signal bit is transmitted by another adapter, the conditions are somewhat more complex. The current occurring in the secondary windings 10a and 10b of the transmit transformer 10 will be sufficient in such a direction as to switch the state of flux of the transformer 10. Only a fractional amount of the current available from resistor 27 will tend to keep the core of the transformer 10 saturated in its proper state. As the core starts to switch, a voltage will be developed which is of such a polarity as to cause diode 23 to partially conduct and the current flow in diode 24 will be reduced by a similar amount. If diode 23 were in full conduction and diode 24 cut-off the magnetizing component for the core of transformer 10 would be approximately 25 milliampere turns which would be substantially greater than the demagnetizing current. The incremental voltage change is sufficient to cause a current flow such that the net milliampere turns on the core is approximately zero and the net effect will be such that about 2 percent of a transmitted signal is dropped across an adapter which is in the receive mode.

Receiver

The receiver transformer 30 has secondaries 30a and 30b connected in series with each side of a balanced transmission line in the same manner as the secondaries 10a and 10b of the transmitter transformer 10. The receiver transformer 30 has a core possessing square-loop characteristics. The transmission line current required to saturate the core is about 6 milliamps which is less than the transmitted current. A low pass filter comprising the resistors 31 and 32 and the capacitor 33 is connected with the primary 30c of the receiver transformer 30. The filter cut-off frequency is chosen to match the main energy spectrum of the transmitted pulse so that the effect of any line noise is minimized. The switching voltage at the secondary windings 30a and 30b is approximately .5 volt compared to a signal voltage of 16 volts so that little signal is lost in each receiver. Because of the coercive force of the core and the low-pass filter the receiver portion of the adapter is relatively insensitive to noise. Approximately 3 milliamps of noise current at the maximum response frequency is required to produce an error.

Transistors 34 and 35 are interconnected to form a latch type circuit. Transistor 36 is an inverter power driven with the collector signal of transistor 36 being connected with the "receive data" terminal 37 of the adapter. A biasing network comprising the resistors 38 and 39 serve to bias the primary 30c of the receive transformer 30 so that the receive signal will be a better match for the switching threshold of the latch comprising the transistors 34 and 35.

A relay 40 is connected to the supply voltage and contains a normally closed contact point 40a. When the power to the adapter unit is "off," the normally closed point 40a functions to short out the primary 10c of the transmit transformer 10. This permits other adapters on the line to operate even when one adapter unit has its power in an "off" condition.

While the invention has been particularly shown and described with reference to a preferred embodiment thereof, it will be understood by those skilled in the art that various changes in form and details may be made therein without departing from the spirit and scope of the invention.

What is claimed is:

1. A data transmission adapter unit comprising:

(a) a data signal transmitter section and a data signal receiving section adapted for connection with data communication lines; said transmitter section including:

(b) transmit transformer coupling means having its output arranged for attachment to the data transmission lines;

(c) a timing transformer coupled with the inputs of said transmit transformer coupling means;

(d) current control switching means responsive to data signals from a data terminal and coupled with said timing transformer for rendering same operative;

(e) said receiving section including:

(f) receiving transformer coupling means having its input arranged for attachment to the data communication lines;

(g) control circuit means coupled with and responsive to said receiving transformer coupling means for applying received data representing signals to a data terminal receiving device.

2. A data transmission adapter unit comprising:

(a) a data signal transmitter section and a data signal receiving section adapted for connection with data communication lines; said transmitter section including:

(b) transmit transformer coupling means having its output arranged for attachment to the data transmission lines;

(c) a timing transformer coupled with the inputs of said transmit transformer coupling means;

(d) current control switching means responsive to data signals from a data terminal and coupled with said timing transformer for rendering same operative;

(e) transmit pulse duration control means coupled with said transformer coupling means and said timing transformer and functioning to terminate each transmit pulse after a predetermined time has elapsed;

(f) said receiving section including:

(g) receiving transformer coupling means having its input arranged for attachment to the data communication lines;

(h) control circuit means coupled with and responsive to said receiving transformer coupling means for applying received data representing signals to a data terminal receiving device.

3. An adapter unit according to claim 2, wherein said receiver includes noise signal eliminating means coupled with said receiving transformer coupling means and functioning to prevent said receiving section from being responsive to noise signals.

References Cited

UNITED STATES PATENTS 3,343,091 9/1967 Bruglemans -------- 178—67 X

ROBERT L. GRIFFIN, Primary Examiner

J. A. BRODSKY, Assistant Examiner